United States Patent
Tseng

(10) Patent No.: US 10,602,394 B2
(45) Date of Patent: Mar. 24, 2020

(54) METHOD AND APPARATUS FOR HANDLING PROHIBIT TIMER FOR SCHEDULING REQUEST (SR) IN A WIRELESS COMMUNICATION SYSTEM

(71) Applicant: ASUSTeK Computer Inc., Taipei (TW)

(72) Inventor: Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 557 days.

(21) Appl. No.: 14/953,286

(22) Filed: Nov. 27, 2015

(65) Prior Publication Data

US 2016/0157256 A1 Jun. 2, 2016

Related U.S. Application Data

(60) Provisional application No. 62/085,858, filed on Dec. 1, 2014.

(51) Int. Cl.
*H04W 28/02* (2009.01)
*H04W 72/12* (2009.01)

(52) U.S. Cl.
CPC ... *H04W 28/0278* (2013.01); *H04W 72/1284* (2013.01)

(58) Field of Classification Search
CPC ......... H04W 28/0278; H04W 72/1284; H04W 74/04
See application file for complete search history.

(56) References Cited

U.S. PATENT DOCUMENTS 8,565,128 B2  10/2013  Guo

| | | | |
|---|---|---|---|
| 2009/0280798 A1* | 11/2009 | Meylan | H04W 72/1284 455/422.1 |
| 2012/0069805 A1 | 3/2012 | Feuersanger | |
| 2013/0235768 A1* | 9/2013 | Earnshaw | H04L 1/1671 370/280 |
| 2015/0092542 A1* | 4/2015 | Yang | H04W 28/0268 370/230 |
| 2016/0128094 A1* | 5/2016 | Lee | H04W 72/14 370/329 |
| 2017/0201904 A1* | 7/2017 | Lee | H04W 28/0278 |

FOREIGN PATENT DOCUMENTS

KR  2014-0119663  10/2014
WO  2014/047899  4/2014

OTHER PUBLICATIONS

3GPP TS 36.321 v11.3.0, 3rd Generation Partnership Project, Technical Specification Group Radio Access Network, Evolved Universal Terrestrial Radio Access (E-UTRA), Medium Access Control (MAC) protocol specification, Jun. 2013, 57 pages. (Year: 2013).*

Notice of Non-Final Rejection received from corresponding Korean Application No. 2015-0166539, dated Jul. 4, 2016.

* cited by examiner

*Primary Examiner* — Hoon J Chung
(74) *Attorney, Agent, or Firm* — Blue Capital Law Firm, P.C.

(57) ABSTRACT

A method and apparatus are disclosed for handling prohibit timer for SR in a wireless communication system. In one embodiment, the method includes triggering a BSR due to a first UL data becoming available in the UE. The method also includes starting a timer associated with the BSR. The method further includes stopping the timer if a specific event relevant to an arrival of a UL grant occurs.

9 Claims, 17 Drawing Sheets

METHOD AND APPARATUS FOR HANDLING PROHIBIT TIMER FOR SCHEDULING REQUEST (SR) IN A WIRELESS COMMUNICATION SYSTEM

CROSS-REFERENCE TO RELATED APPLICATIONS

The present Application claims the benefit of U.S. Provisional Patent Application Ser. No. 62/085,858 filed on Dec. 1, 2014, the entire disclosure of which is incorporated herein by reference.

FIELD

This disclosure generally relates to wireless communication networks, and more particularly, to a method and apparatus for handling prohibit timer for SR in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed for handling prohibit timer for SR in a wireless communication system. In one embodiment, the method includes triggering a BSR (Buffer Status Report) due to a first UL data becoming available in the UE (User Equipment). The method also includes starting a timer associated with the BSR. The method further includes stopping the timer if a specific event relevant to an arrival of a UL grant occurs.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: R2-144973, "Prohibiting SR for Low Priority Bearers", Nokia Networks, Nokia Corporation, NTT DOCOMO, INC.; R2-145230, "Prohibit timer for SR", Ericsson; R2-145292, "Prohibit timer for SR", Ericsson, Nokia Networks; R2-145293, "Prohibit timer for SR", Ericsson, Nokia Networks, Samsung, NTT DOCOMO; and TS 36.321 v12.3.0, "Medium Access Control (MAC) protocol specification". The standards and documents listed above are hereby expressly incorporated by reference in their entirety.

Figure 1:
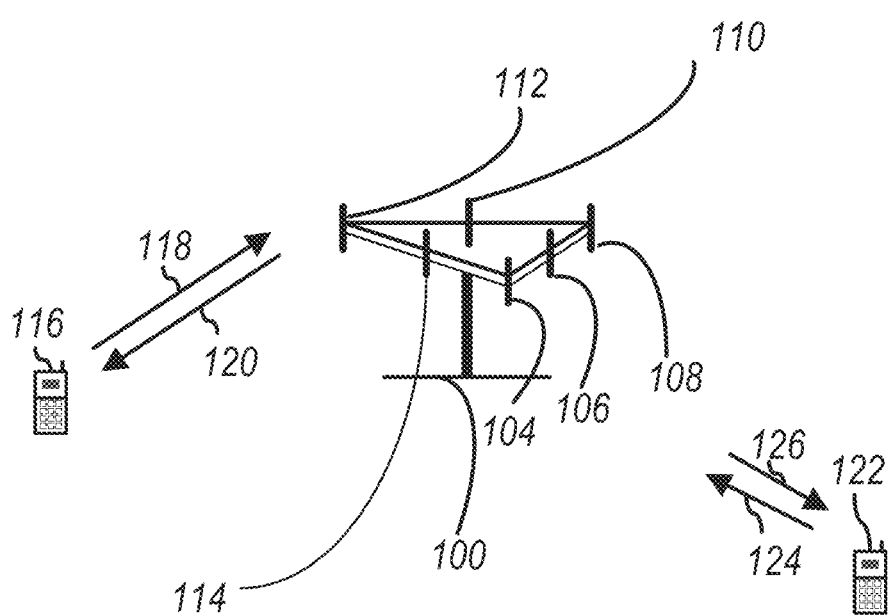
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
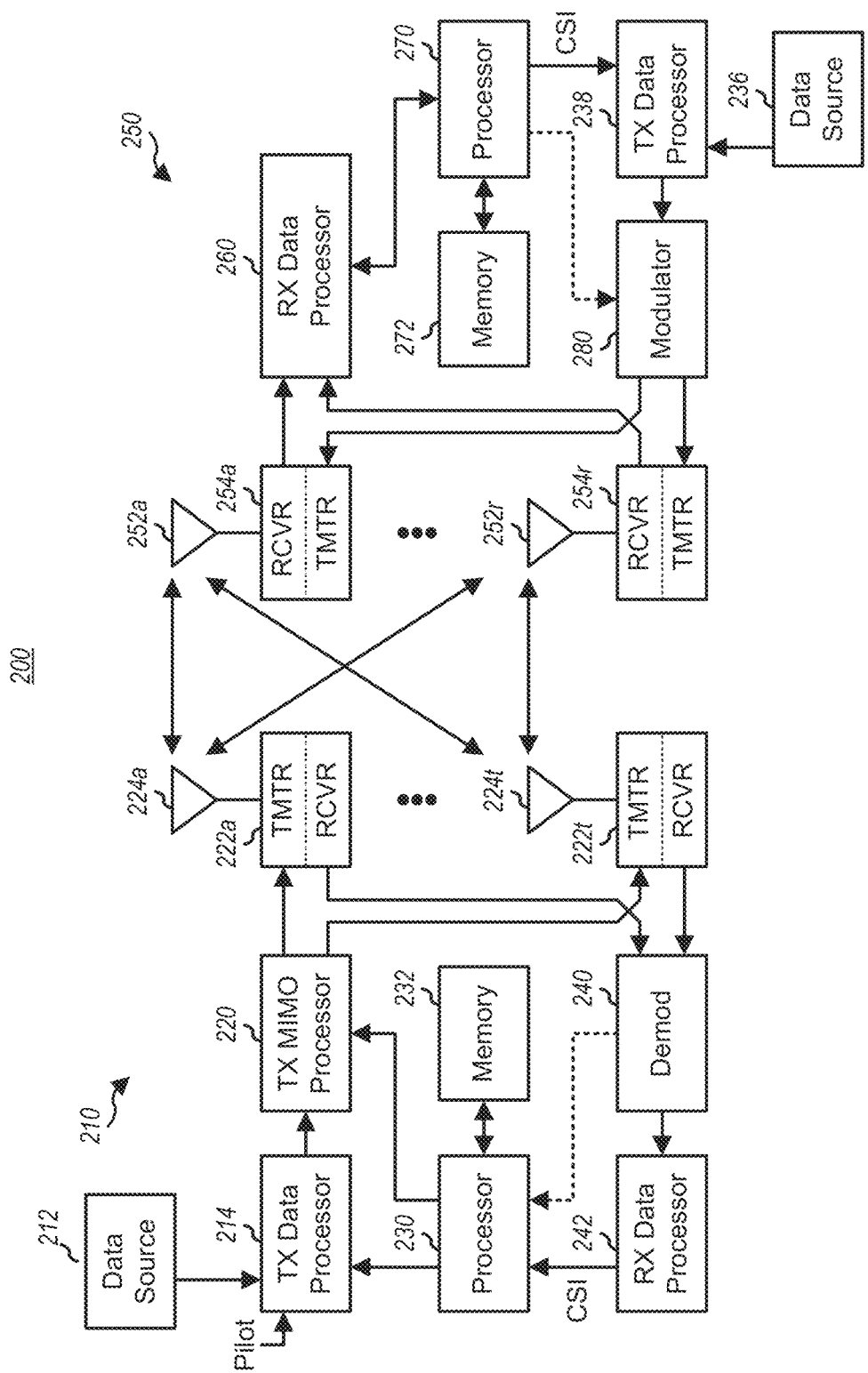
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
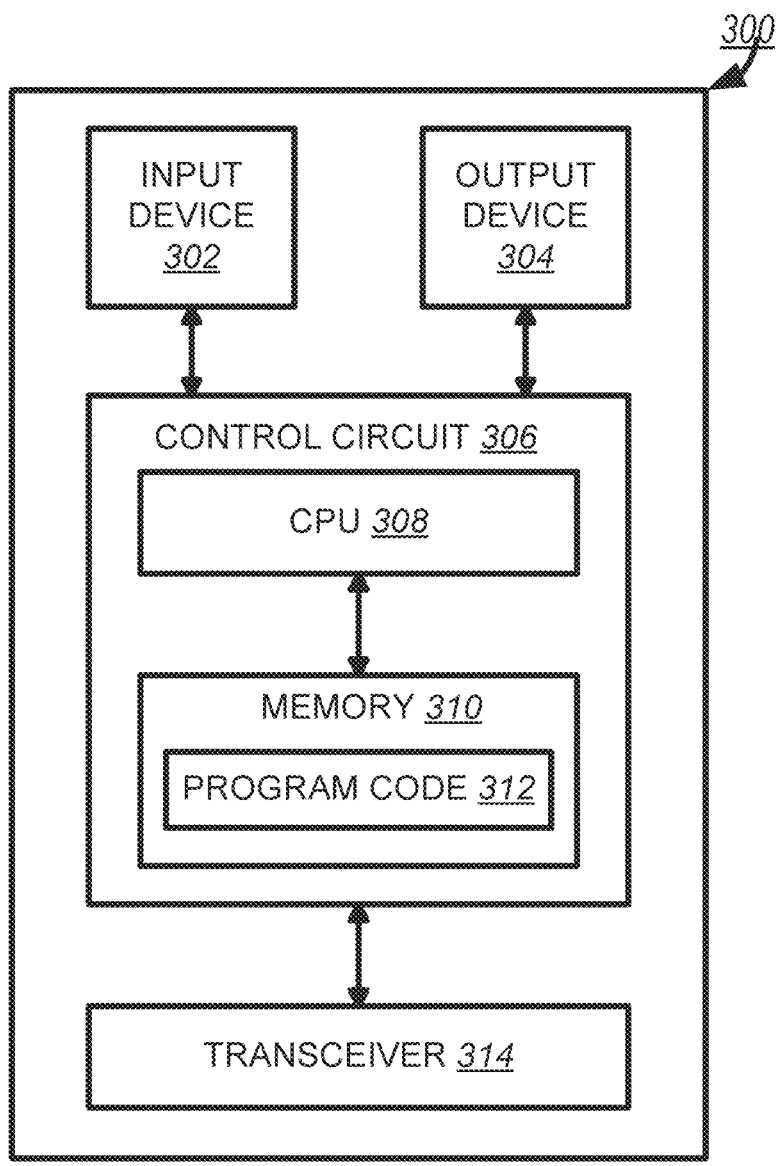
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
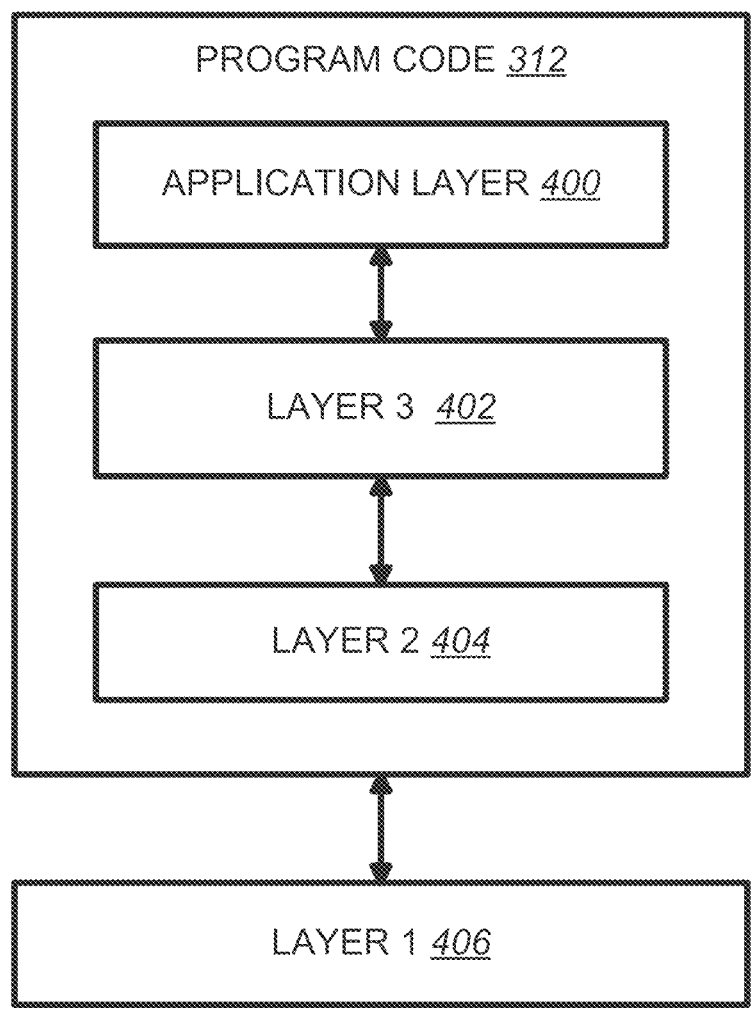
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP R2-144973 states:

Currently, when SPS is not configured the only way to stop a low priority logical channel from requesting resources upon data arrival is to not allocate an LCG to that logical channel. By not allocating an LCG, the logical channel will never trigger a BSR, which—if no resources are allocated—will never trigger an SR. A major drawback with this approach is that as a result of not configuring an LCG, the logical channel will never be reported in BSR and the eNB will not know how much data is buffered for that logical channel, therefore prohibiting accurate scheduling. When SPS is configured, there is since Rel-9 the possibility to prohibit SR for a logical channel while still reflecting its status in BSR thanks to the addition of logicalChannelSR-Mask [R2-097459] [R2-097460]. This mechanism can be used to suppress SRs due to continuous UL packet arrival as in e.g. VoLTE. Unfortunately, the Rel-9 solution cannot cover another implementation choice where VoLTE is dynamically served to allow delay packing. With dynamic scheduling, the UE wakes up everytime an SR is transmitted on PUCCH due to UL voice packet arrival. With the knowledge of UL data arrival period the eNB could grant resources to cancel the request. However, this would complicate eNB scheduler implementation. This is because the eNB may have to learn the right timing to send an UL grant for the SR suppression by trial and error due to the gap of base band processing and SR transmission in the UE. Besides, it is worth noting that there is a history why the FGI on SPS has not been set to TRUE yet. SPS was thought as an unlikely feature to be implemented and tested.

Furthermore, 3GPP R2-145230 states:

For certain types of traffic the frequency of SR transmissions may be quite high due to many small UL transmissions. This may happen for instance for normal interactive TCP traffic, where there is a need to send requests for frequent TCP ACKs or for conversational speech and/or video traffic which has frequently occurring UL transmissions. For some traffic scenarios it is important to send SRs as quickly as possible. However, since this may for instance impact the throughput of TCP traffic, sending an SR can be delayed if the eNB knows or can estimate the traffic pattern and can periodically provide a grant to the UE when necessary, e.g. conversational speech or video. Hence, if we want to introduce a way to delay or inhibit an SR it is important to be able to configure this per logical channel, because different types of traffic will be impacted differently when introducing SR delays.

Observation 1 to Delay or Inhibit an SR, it should be Possible to Configure it Individually Per Logical Channel.

In a highly loaded cell with many active UEs, the frequency of transmitted SRs is very high. For the traffic scenarios where SRs can be delayed without any impact on the performance, it would be beneficial for the radio system to delay or inhibit an SR in these specific cases. For certain logical channels where the eNB can predict the UL traffic better, it would be an advantage if an SR triggered for this logical channel would be prohibited or delayed considering that the eNB would anyway provide a grant to the UE based on the traffic type. By decreasing the amount of SRs triggered, the load on the SR channel decrease and thus the number of grants sent by the eNB will decrease. The UE may in some cases be able to remain longer in the DRX sleep state which would improve the battery life time.

Observation 2 for a Logical Channel, Inhibiting or Delaying the Triggering of an SR can Improve the Radio Capacity and Result in Improved Battery Life Time for the UE.

If we were to inhibit a triggered SR altogether for a logical channel this would create a potential risk because even if the eNB tries to estimate the need for UL transmissions for the logical channel it may happen that the estimate results in either too frequent grants or too infrequent grants, as follows:

eNB is sending grants too frequently: This causes unnecessary load and interference on the PDCCH and the PUSCH channels, and results in unnecessary transmissions in the uplink. The UE would waste power for only sending padding.

eNB is sending grants too infrequently: This results in unnecessary long latency for this type of traffic. If for instance TCP traffic is used, long latency for TCP ACKS will result in lower throughput than if the TCP ACK would be sent with short latency. There is also a risk that the UE is ordered to go to RRC idle state before even having the chance to notify the eNB that it has data to send. This will result in an unnecessary switch from RRC connected state to RRC idle state and back again to RRC connected state to be able to transmit the data.

As an example of when it is difficult for the eNB to predict the UL transmissions by the UE is when a UE has a configured speech radio bearer but where the UE is currently in silent state, then the eNB cannot easily estimate when the UE will switch back from silent state to talk state. This case would therefore require the UE to send an SR to notify the eNB when it needs to switch back to talk state again, because the eNB will not be able to estimate the grant timing in this case.

Observation 3 Completely Inhibiting an SR for Certain Logical Channels May Cause a Risk of Bad Radio and UE Performance or Unnecessary Long Latencies for the Data.

To avoid the risk of causing bad radio performance and unnecessary battery usage by the UE because of too frequent grants, and at the same time avoid too long latencies because of too infrequent grants, it is necessary to use a delayed SR rather than a completely inhibited SR. By delaying an SR up to a maximum configured value for a specific logical channel, it is guaranteed that the latency for UL transmissions will not exceed the SR delay even if the eNB grants the UE rather infrequently in order to save radio resources.

Observation 4 it is Possible to Avoid the Risks if the eNB does not Know when the UE is Transmitting UL Data by Using a Delayed SR Instead of Completely Inhibiting the SR. This is Due to the Increased Latency being Limited by the Length of the SR Delay.

In addition, U.S. Pat. No. 8,582,514 entitled "Prohibiting Unnecessary Scheduling Requests for Uplink Grants" states:

FIG. 4 [of U.S. Pat. No. 8,582,514 (which has been reproduced as FIG. 5 of the present application)] illustrates an example of semi-persistent uplink resource allocations for VoIP and how VoIP and non-VoIP data are handled with respect to scheduling requests.

[ . . . ]

Figure 5:
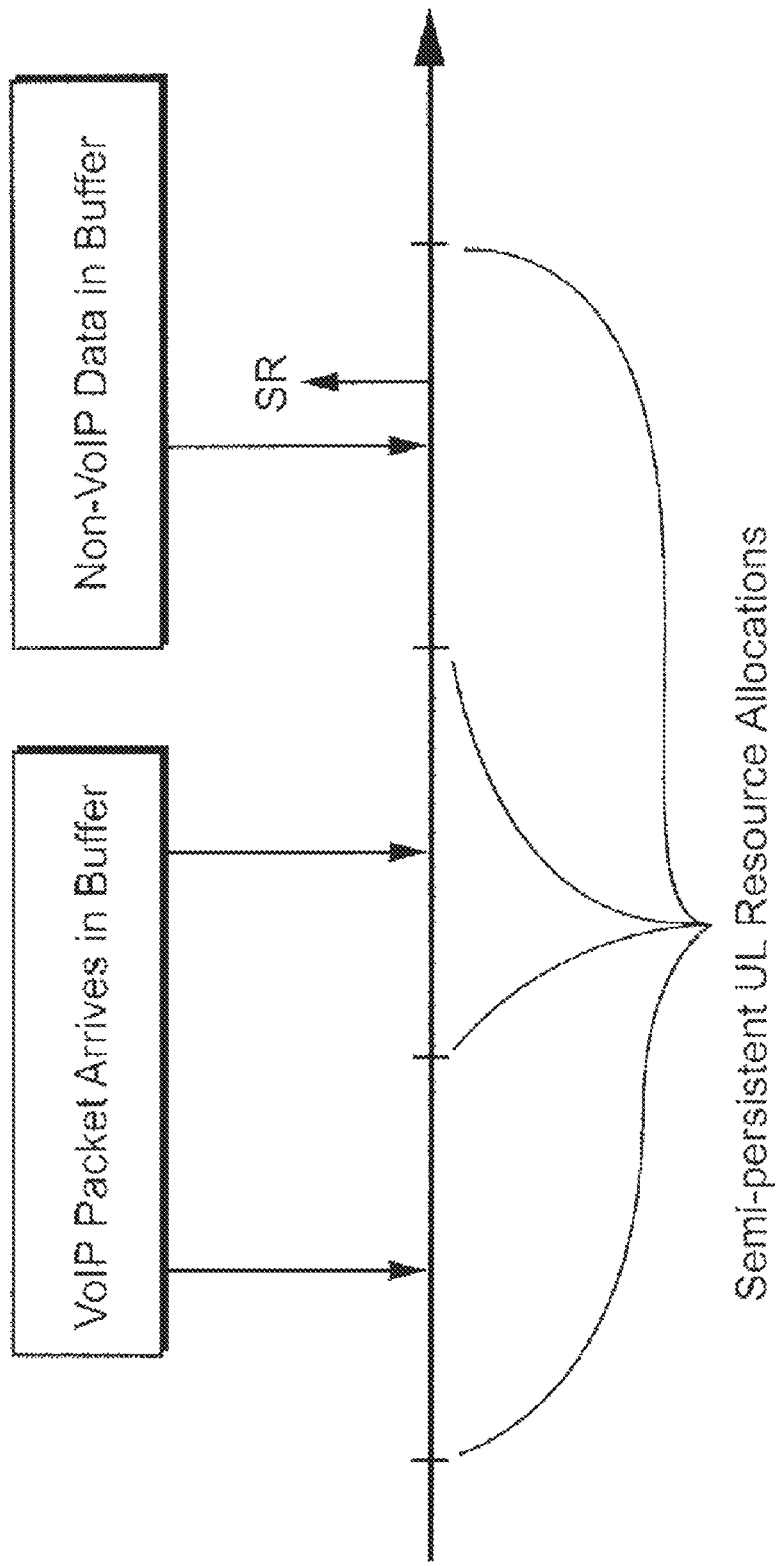
FIG. 5 is a reproduction of FIG. 4 of U.S. Pat. No. 8,582,514.
Figure 6:
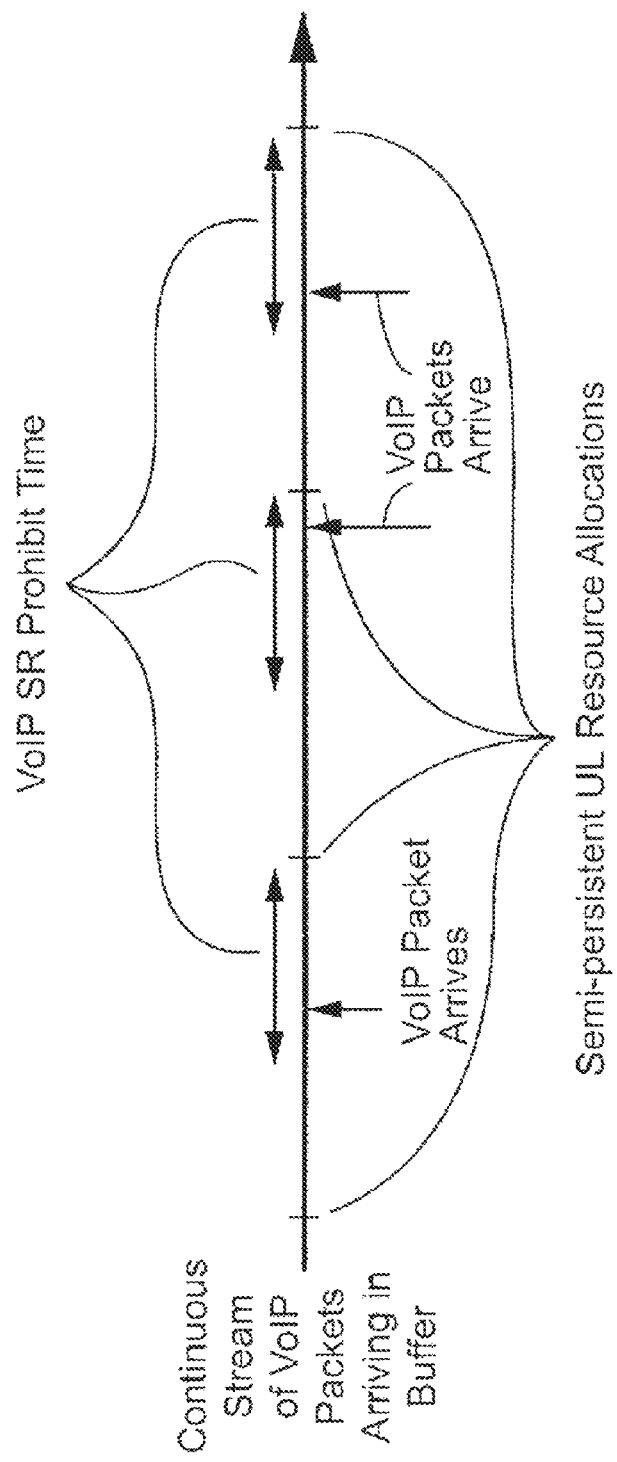
FIG. 6 is a reproduction of FIG. 5 of U.S. Pat. No. 8,582,514.

FIG. 5 [of U.S. Pat. No. 8,582,514 (which has been reproduced as FIG. 6 of the present application)] illustrates an example of a continuous stream of VoIP packets arriving in the terminal's transmit buffer when semi-persistent uplink resource allocations for VoIP packets have been allocated for this terminal along with a VoIP SR prohibit time period used in each transmission time period.

[ . . . ]

LTE also offers the opportunity to use semi-persistent scheduling in which a UE is allocated an UL resource with some periodicity. A benefit of semi-persistent scheduling is that it saves scarce radio resources on the Physical Downlink Control Channel (PDCCH) by avoiding the transmission of UL grants for every resource allocation. One service likely to benefit from a semi-persistent scheduling configuration is voice over IP (VoIP). When a UE has an UL semi-persistent radio resource configured for a VoIP flow or the like, each packet arriving to an empty buffer triggers a RA-SR or a D-SR unless the timing of the resource is perfectly aligned with the arrival of the VoIP data. In other words, there will likely be many instances when each packet arriving to an empty buffer triggers a RA-SR or a D-SR—even though a SR is unnecessary given the semi-persistent scheduling of UL resource for the VoIP flow. In this situation, the UL scheduler cannot distinguish between an RA-SR or a D-SR triggered (1) by a VoIP frame (that typically does not need the scheduler to respond to the SR because the semi-persistent scheduling already has a resource ready for the VoIP frame in the near future) or (2) by some higher priority data (e.g. related to a signaling radio bearer (SRB) which does need the scheduler to respond to the SR). The scheduler either ignores all SRs from the UE or schedules the UE dynamically for all SRs. In the first case, the transmission of higher priority data, like signaling radio bearer (SRB) data, might be delayed until the next semi-persistent resource comes up. If the delayed higher priority data takes the next semi-persistent resource, then the buffered, lower priority VoIP data is delayed until the next semi-persistent grant comes along. If VoIP frames are bundled, extra delay time could be 40 ms or more, which may be unacceptable. In the second case, there is not much benefit from using semi-persistent resource scheduling because both PDCCH grants and SRs will be sent extensively regardless.

[ . . . ]

Accordingly, scheduling requests (SRs) can be prohibited for a lower priority data flow, logical channel group (e.g., VoIP configured with semi-persistent resource allocation), or other grouping but still be triggered for higher priority traffic (e.g., data associated with a signaling radio bearer (SRB)). This enables more efficient scheduling since the scheduler can distinguish between different priority flows or groups (e.g., LCGs) without waiting for a buffer status report (BSR), which also means that the UL scheduler, e.g., can choose to allocate a resource with robust coding and modulation in case the data is regarded as sensitive. Another advantageous result is less delay for delay sensitive, high priority data and reduced uplink and downlink control signaling (i.e., fewer SRs and uplink grants) when a semi-persistent resource is scheduled.

Also, 3GPP R2-145292 states:

The only way to stop a logical channel from requesting resources upon data arrival is to not to allocate an LCG to that logical channel when SPS is not configured. If no LCG is allocated, the logical channel will never trigger a BSR, which—if no resources are allocated—will never trigger an SR. One drawback with this solution is that data for the logical channel may be delayed for a long time or not sent at all, because the UE may not trigger an SR for a potentially very long time and it can happen that the UE is requested to go to RRC idle state before having the possibility to send an SR. Another drawback with this approach is that the logical channel will never be reported in BSR and the eNB will not know how much data is buffered for that logical channel, and thus cause inaccurate scheduling.

An optional SR Trigger Prohibit timer is added in the MAC layer (logicalChannelSR-ProhibitTimer) to delay SR triggering for logical channels which have been configured for SR delay. Upon new UL data arrival from higher layers for a logical channel configured for SR delay it will trigger a regular BSR but not immediately an SR.

There is no way to enable BSR and at the same time avoid too frequent SRs for logical channels which do not require too frequent SR transmissions. This may result in unnecessary load in the radio interface due to unnecessary many SR transmissions for logical channels that do not require too frequent SR transmissions.

[ . . . ]

5.4.5 Buffer Status Reporting

The Buffer Status reporting procedure is used to provide the serving eNB with information about the amount of data available for transmission in the UL buffers of the UE. RRC controls BSR reporting by configuring the three timers periodicBSR-Timer, retxBSR-Timer and logicalChannelSR-ProhibitTimer and by, for each logical channel, optionally signalling logicalChannelGroup which allocates the logical channel to an LCG [8].

For the Buffer Status reporting procedure, the UE shall consider all radio bearers which are not suspended and may consider radio bearers which are suspended.

A Buffer Status Report (BSR) shall be triggered if any of the following events occur:

UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

For Regular BSR:

if the BSR is triggered due to data becoming available for transmission for a logical channel for which logicalChannelSR-ProhibitTimer is setup by upper layers:

if not running, start the logicalChannelSR-ProhibitTimer;

else:

if running, stop the logicalChannelSR-ProhibitTimer.

[ . . . ]

If the Buffer Status reporting procedure determines that at least one BSR has been triggered and not cancelled:

if the UE has UL resources allocated for new transmission for this TTI:

instruct the Multiplexing and Assembly procedure to generate the BSR MAC control element(s);

start or restart periodicBSR-Timer except when all the
generated BSRs are Truncated BSRs;
start or restart retxBSR-Timer.
else if a Regular BSR has been triggered and logical-
ChannelSR-ProhibitTimer is not running:
if an uplink grant is not configured or the Regular BSR
was not triggered due to data becoming available for
transmission for a logical channel for which logical
channel SR masking (logicalChannelSR-Mask) is
setup by upper layers:
a Scheduling Request shall be triggered.

A MAC PDU shall contain at most one MAC BSR control element, even when multiple events trigger a BSR by the time a BSR can be transmitted in which case the Regular BSR and the Periodic BSR shall have precedence over the padding BSR.

The UE shall restart retxBSR-Timer upon indication of a grant for transmission of new data on any UL-SCH.

All triggered BSRs shall be cancelled in case the UL grant(s) in this subframe can accommodate all pending data available for transmission but is not sufficient to additionally accommodate the BSR MAC control element plus its subheader. All triggered BSRs shall be cancelled when a BSR is included in a MAC PDU for transmission.

[ . . . ]

Furthermore, 3GPP R2-145293 states:
MAC-MainConfig Information Element

```
-- ASN1START
MAC-MainConfig ::=              SEQUENCE {
[...]
    logicalChannelSR-Config-r12    CHOICE {
        release                    NULL,
        setup                      SEQUENCE {
            logicalChannelSR-ProhibitTimer-r12
ENUMERATED {sf10, sf20, sf40, sf64, sf128, sf512, sf1024, sf2560}
        }
    }
    OPTIONAL                   -- Need ON]]
}
[...]
-- ASN1STOP
```

MAC-MainConfig field descriptions

[. . .]
logicalChannelSR-ProhibitTimer
Timer used to delay the transmission of an SR for logical channels marked with logicalChannelSR-Prohibit. Value sf20 corresponds to 20 subframes, sf40 corresponds to 40 subframes, and so on. See TS 36.321 [6].
[. . .]

In addition, 3GPP TS 36.321 v 12.3.0 states:
3.1 Definitions

For the purposes of the present document, the terms and definitions given in TR 21.905 [1] and the following apply. A term defined in the present document takes precedence over the definition of the same term, if any, in TR 21.905 [1].

Active Time: Time related to DRX operation, as defined in subclause 5.7, during which the UE monitors the PDCCH.

mac-ContentionResolutionTimer: Specifies the number of consecutive subframe(s) during which the UE shall monitor the PDCCH after Msg3 is transmitted.

DRX Cycle: Specifies the periodic repetition of the On Duration followed by a possible period of inactivity (see FIGS. 3.1-1 below).

Figure 7:
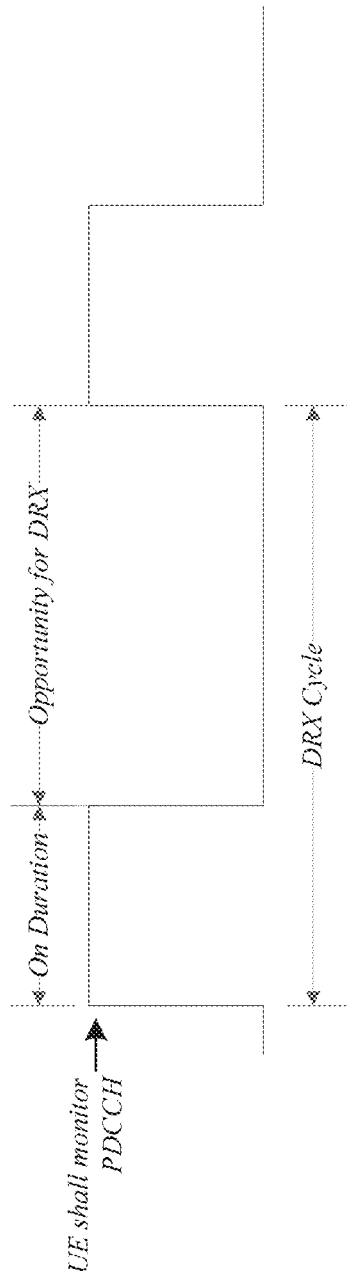
FIG. 7 is a reproduction of FIGS. 3.1-1 of 3GPP TS 36.321 v12.3.0.

[FIGS. 3.1-1 of 3GPP TS 36.321 v12.3.0 has been reproduced as FIG. 7 of the present application] drx-InactivityTimer: Specifies the number of consecutive PDCCH-subframe(s) after the subframe in which a PDCCH indicates an initial UL or DL user data transmission for this UE.

drx-RetransmissionTimer: Specifies the maximum number of consecutive PDCCH-subframe(s) until a DL retransmission is received.

drxShortCycleTimer: Specifies the number of consecutive subframe(s) the UE shall follow the Short DRX cycle.

drxStartOffset: Specifies the subframe where the DRX Cycle starts.

[ . . . ]

5.4.4 Scheduling Request

The Scheduling Request (SR) is used for requesting UL-SCH resources for new transmission.

When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR (see subclause 5.4.5), or when the UL grant(s) can accommodate all pending data available for transmission.

If an SR is triggered and there is no other SR pending, the UE shall set the SR_COUNTER to 0.

As long as one SR is pending, the UE shall for each TTI:
if no UL-SCH resources are available for a transmission in this TTI:
if the UE has no valid PUCCH resource for SR configured in any TTI: initiate a Random Access procedure (see subclause 5.1) on the PCell and cancel all pending SRs;
else if the UE has a valid PUCCH resource for SR configured for this TTI and if this TTI is not part of a measurement gap and if sr-ProhibitTimer is not running:
if SR_COUNTER<dsr-TransMax:
increment SR_COUNTER by 1;
instruct the physical layer to signal the SR on PUCCH;
start the sr-ProhibitTimer.
else:
notify RRC to release PUCCH/SRS for all serving cells;
clear any configured downlink assignments and uplink grants;
initiate a Random Access procedure (see subclause 5.1) on the PCell and cancel all pending SRs.

5.7 Discontinuous Reception (DRX)

The UE may be configured by RRC with a DRX functionality that controls the UE's PDCCH monitoring activity for the UE's C-RNTI, TPC-PUCCH-RNTI, TPC-PUSCH-RNTI, Semi-Persistent Scheduling C-RNTI (if configured) and eIMTA-RNTI (if configured). When in RRC_CONNECTED, if DRX is configured, the UE is allowed to monitor the PDCCH discontinuously using the DRX operation specified in this subclause; otherwise the UE monitors the PDCCH continuously. When using DRX operation, the UE shall also monitor PDCCH according to requirements found in other subclauses of this specification. RRC controls DRX operation by configuring the timers onDurationTimer, drx-InactivityTimer, drx-RetransmissionTimer (one per DL HARQ process except for the broadcast process), the longDRX-Cycle, the value of the drxStartOffset and optionally the drxShortCycleTimer and shortDRX-Cycle. A HARQ RTT timer per DL HARQ process (except for the broadcast process) is also defined (see subclause 7.7).

When a DRX cycle is configured, the Active Time includes the time while:
- onDurationTimer or drx-InactivityTimer or drx-Retransmission Timer or mac-ContentionResolutionTimer (as described in subclause 5.1.5) is running; or
- a Scheduling Request is sent on PUCCH and is pending (as described in subclause 5.4.4); or
- an uplink grant for a pending HARQ retransmission can occur and there is data in the corresponding HARQ buffer; or
- a PDCCH indicating a new transmission addressed to the C-RNTI of the UE has not been received after successful reception of a Random Access Response for the preamble not selected by the UE (as described in subclause 5.1.4).

When DRX is configured, the UE shall for each subframe:
- if a HARQ RTT Timer expires in this subframe and the data of the corresponding HARQ process was not successfully decoded:
  - start the drx-RetransmissionTimer for the corresponding HARQ process.
- if a DRX Command MAC control element or a Long DRX Command MAC control element is received:
  - stop onDurationTimer;
  - stop drx-InactivityTimer.
- if drx-InactivityTimer expires or a DRX Command MAC control element is received in this subframe:
  - if the Short DRX cycle is configured:
    - start or restart drxShortCycleTimer;
    - use the Short DRX Cycle.
  - else:
    - use the Long DRX cycle.
- if drxShortCycleTimer expires in this subframe:
  - use the Long DRX cycle.
- if a Long DRX Command MAC control element is received:
  - stop drxShortCycleTimer;
  - use the Long DRX cycle.
- If the Short DRX Cycle is used and [(SFN*10)+subframe number] modulo (shortDRX-Cycle)=(drxStartOffset) modulo (shortDRX-Cycle); or
- if the Long DRX Cycle is used and [(SFN*10)+subframe number] modulo (longDRX-Cycle)=drxStartOffset:
  - start onDurationTimer.
- during the Active Time, for a PDCCH-subframe, if the subframe is not required for uplink transmission for half-duplex FDD UE operation, if the subframe is not a half-duplex guard subframe [7] and if the subframe is not part of a configured measurement gap; or
- during the Active Time, for a subframe other than a PDCCH-subframe and for a UE capable of simultaneous reception and transmission in the aggregated cells, if the subframe is a downlink subframe indicated by a valid eIMTA L1 signalling for at least one serving cell not configured with schedulingCellId [8] and if the subframe is not part of a configured measurement gap; or
- during the Active Time, for a subframe other than a PDCCH-subframe and for a UE not capable of simultaneous reception and transmission in the aggregated cells, if the subframe is a downlink subframe indicated by a valid eIMTA L1 signalling for the PCell and if the subframe is not part of a configured measurement gap:
  - monitor the PDCCH;
  - if the PDCCH indicates a DL transmission or if a DL assignment has been configured for this subframe:
    - start the HARQ RTT Timer for the corresponding HARQ process;
    - stop the drx-Retransmission Timer for the corresponding HARQ process.
  - if the PDCCH indicates a new transmission (DL or UL):
    - start or restart drx-InactivityTimer.
- in current subframe n, if the UE would not be in Active Time considering grants/assignments/DRX Command MAC control elements received and Scheduling Request sent until and including subframe n−5 when evaluating all DRX Active Time conditions as specified in this subclause, type-0-triggered SRS [2] shall not be reported.
- if CQI masking (cqi-Mask) is setup by upper layers:
  - in current subframe n, if onDurationTimer would not be running considering grants/assignments/DRX Command MAC control elements received until and including subframe n−5 when evaluating all DRX Active Time conditions as specified in this subclause, CQI/PMI/RI/PTI on PUCCH shall not be reported.
- else:
  - in current subframe n, if the UE would not be in Active Time considering grants/assignments/DRX Command MAC control elements received and Scheduling Request sent until and including subframe n−5 when evaluating all DRX Active Time conditions as specified in this subclause, CQI/PMI/RI/PTI on PUCCH shall not be reported.

Regardless of whether the UE is monitoring PDCCH or not, the UE receives and transmits HARQ feedback and transmits type-1-triggered SRS [2] when such is expected.

NOTE: The same active time applies to all activated serving cell(s).

NOTE: In case of downlink spatial multiplexing, if a TB is received while the HARQ RTT Timer is running and the previous transmission of the same TB was received at least N subframes before the current subframe (where N corresponds to the HARQ RTT Timer), the UE should process it and restart the HARQ RTT Timer.

Figure 8:
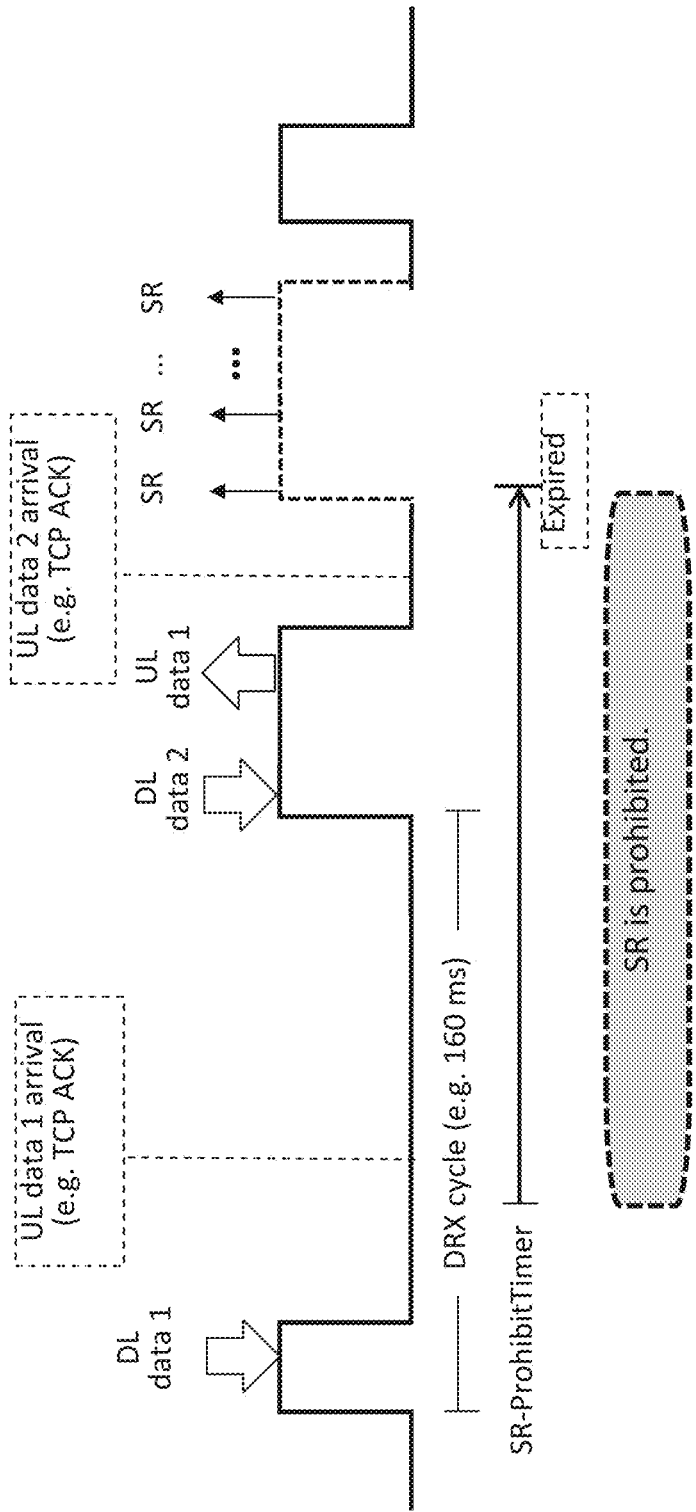
FIG. 8 is a diagram according to one exemplary embodiment.

As shown in FIG. 8, DL (Downlink) data 1 (e.g., a packet of web browsing) is received, and the SR (Scheduling Request) Prohibit Timer is started due to the arrival of UL (Uplink) data 1 (e.g., TCP ACK), which is associated with the DL data 1. Since UL data 1 is from a logical channel restricted to the SR Prohibit timer, no SR could be sent when the timer is running for saving UE power to monitor the PDCCH (Physical Downlink Control Channel) of UL grant. A UL grant would be scheduled by network later so that the UL data 1 can be sent. Meanwhile, DL data 2 is coming, and the corresponding UL data 2 arrives later, as the case of DL data 1 and UL data 1. As seen in FIG. 8, the SR Prohibit timer expires upon arrival of UL data 2. This means that UE would trigger/send a Scheduling Request (SR) for UL data 2 and would enter DRX (Discontinuous Reception) Active Time to remain active for monitoring PDCCH of UL grant for sending UL data 2, resulting in unnecessary SR transmissions (e.g., interference to other UEs) and power waste.

Figure 9:
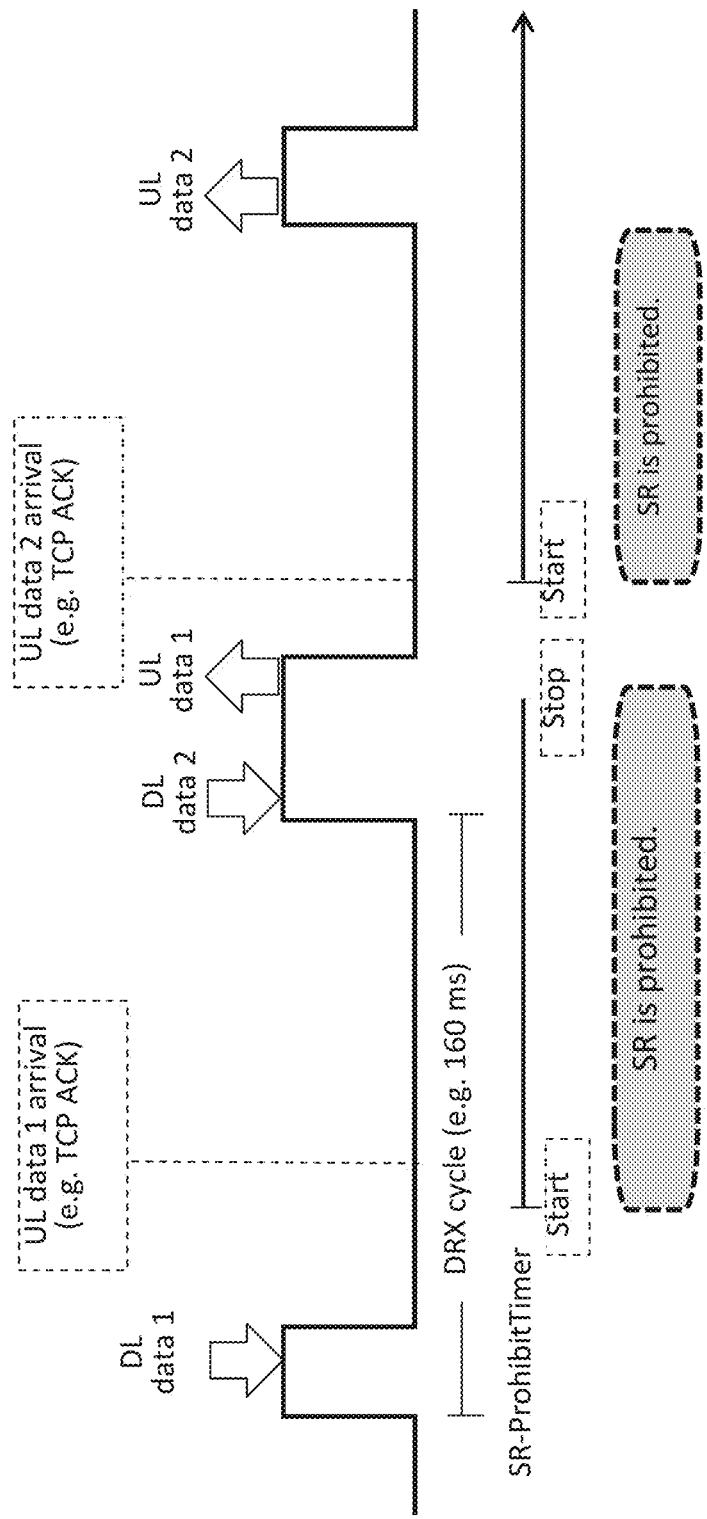
FIG. 9 is a diagram according to one exemplary embodiment.

Considering the aforementioned case, the UE could stop the SR prohibit timer at a proper timing. There are several events which could be used for determining the stopping of the SR timing. As illustrated in FIG. 9, one example is to stop the SR prohibit timer upon reception/detection of a UL grant. Another example is to stop the SR prohibit timer upon transmission of the UL data 1 or upon cancellation of the BSR (Buffer Status Reporting/Report).

Figure 10:
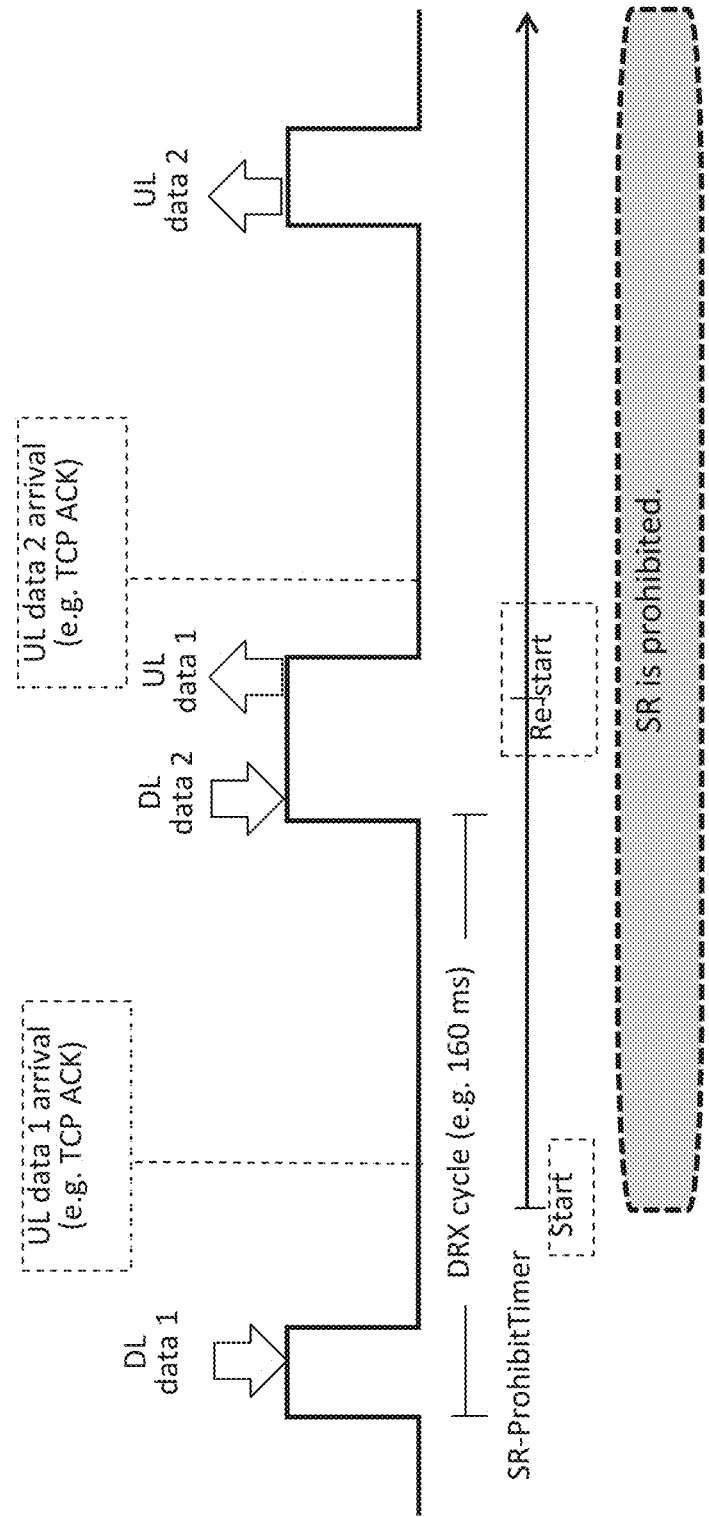
FIG. 10 is a diagram according to one exemplary embodiment.

In addition to the stopping of the SR timing, it is also possible to restart the SR prohibit timer when one of the aforementioned events (e.g., reception/detection of a UL grant, transmission of the UL data, and cancellation of the BSR) occurs as illustrated in FIG. 10.

Figure 11:
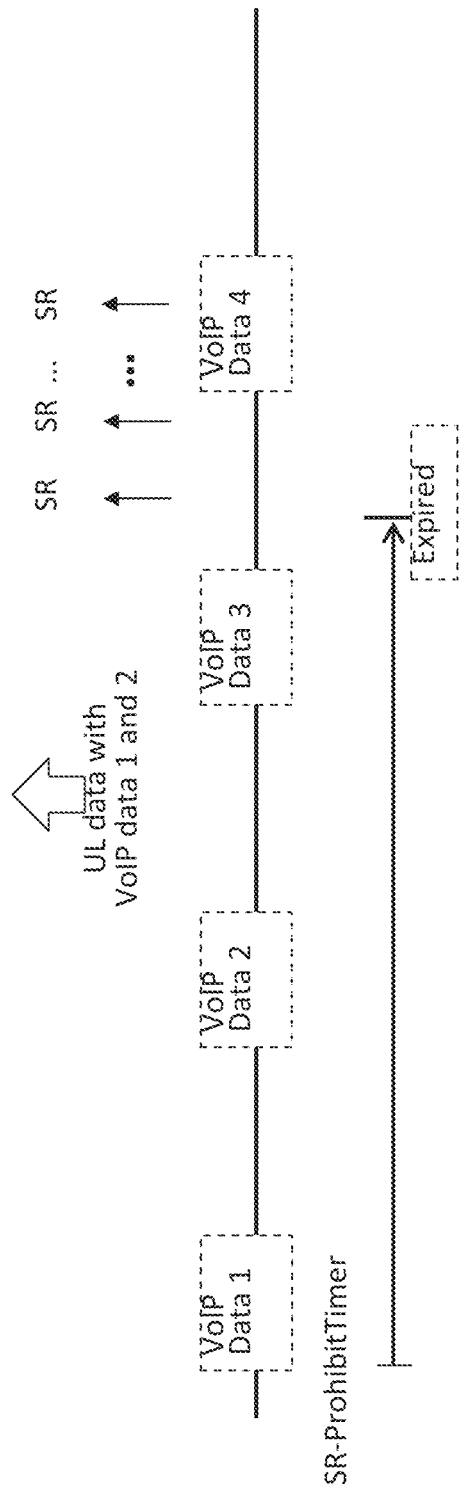
FIG. 11 is a diagram according to one exemplary embodiment.
Figure 12:
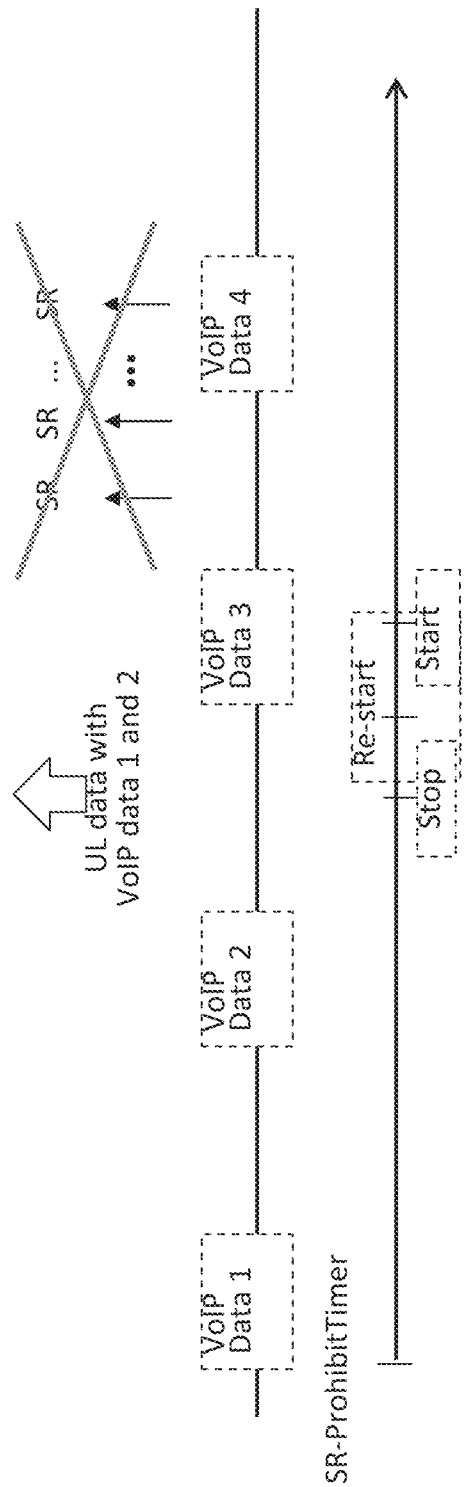
FIG. 12 is a diagram according to one exemplary embodiment.

As seen in FIG. 11, for the case of sending more than one VoIP data with one UL grant, the problem mentioned above could also exist if the length of the SR Prohibit Timer is longer than the periodicity of VoIP data arrival. Such problem can be solved by stopping or restarting the SR Prohibit timer as illustrated in FIG. 12.

In one embodiment, the 3GPP TS 36.321 standard or specification could be revised as follows:

5.4.5 Buffer Status Reporting

The Buffer Status reporting procedure is used to provide the serving eNB with information about the amount of data available for transmission in the UL buffers of the UE. RRC controls BSR reporting by configuring the three timers periodicBSR-Timer, retxBSR-Timer and logicalChannelSR-ProhibitTimer and by, for each logical channel, optionally signalling logicalChannelGroup which allocates the logical channel to an LCG [8].

For the Buffer Status reporting procedure, the UE shall consider all radio bearers which are not suspended and may consider radio bearers which are suspended.

A Buffer Status Report (BSR) shall be triggered if any of the following events occur:
  UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";
  UL resources are allocated and number of padding bits is equal to or larger than the size of the Buffer Status Report MAC control element plus its subheader, in which case the BSR is referred below to as "Padding BSR";
  retxBSR-Timer expires and the UE has data available for transmission for any of the logical channels which belong to a LCG, in which case the BSR is referred below to as "Regular BSR";
  periodicBSR-Timer expires, in which case the BSR is referred below to as "Periodic BSR".
  For Regular BSR:
  if the BSR is triggered due to data becoming available for transmission for a logical channel for which logicalChannelSR-ProhibitTimer is setup by upper layers:
    if not running, start the logicalChannelSR-ProhibitTimer:
  else:
    if running, stop the logicalChannelSR-ProhibitTimer.
  [ . . . ]
If the Buffer Status reporting procedure determines that at least one BSR has been triggered and not cancelled:
  if the UE has UL resources allocated for new transmission for this TTI:
    instruct the Multiplexing and Assembly procedure to generate the BSR MAC control element(s);
    start or restart periodicBSR-Timer except when all the generated BSRs are Truncated BSRs;
    start or restart retxBSR-Timer.
    stop logicalChannelSR-ProhibitTimer if running. (Method 1)
    restart logicalChannelSR-ProhibitTimer if running. (Method 2)
  else if a Regular BSR has been triggered and logicalChannelSR-ProhibitTimer is not running:
    if an uplink grant is not configured or the Regular BSR was not triggered due to data becoming available for transmission for a logical channel for which logical channel SR masking (logicalChannelSR-Mask) is setup by upper layers:
      a Scheduling Request shall be triggered.

A MAC PDU shall contain at most one MAC BSR control element, even when multiple events trigger a BSR by the time a BSR can be transmitted in which case the Regular BSR and the Periodic BSR shall have precedence over the padding BSR.

The UE shall restart retxBSR-Timer upon indication of a grant for transmission of new data on any UL-SCH.

All triggered BSRs shall be cancelled in case the UL grant(s) in this subframe can accommodate all pending data available for transmission but is not sufficient to additionally accommodate the BSR MAC control element plus its subheader. All triggered BSRs shall be cancelled when a BSR is included in a MAC PDU for transmission. When all triggered BSRs are cancelled, stop logicalChannelSR-ProhibitTimer if running. (Method 3)

Figure 13:
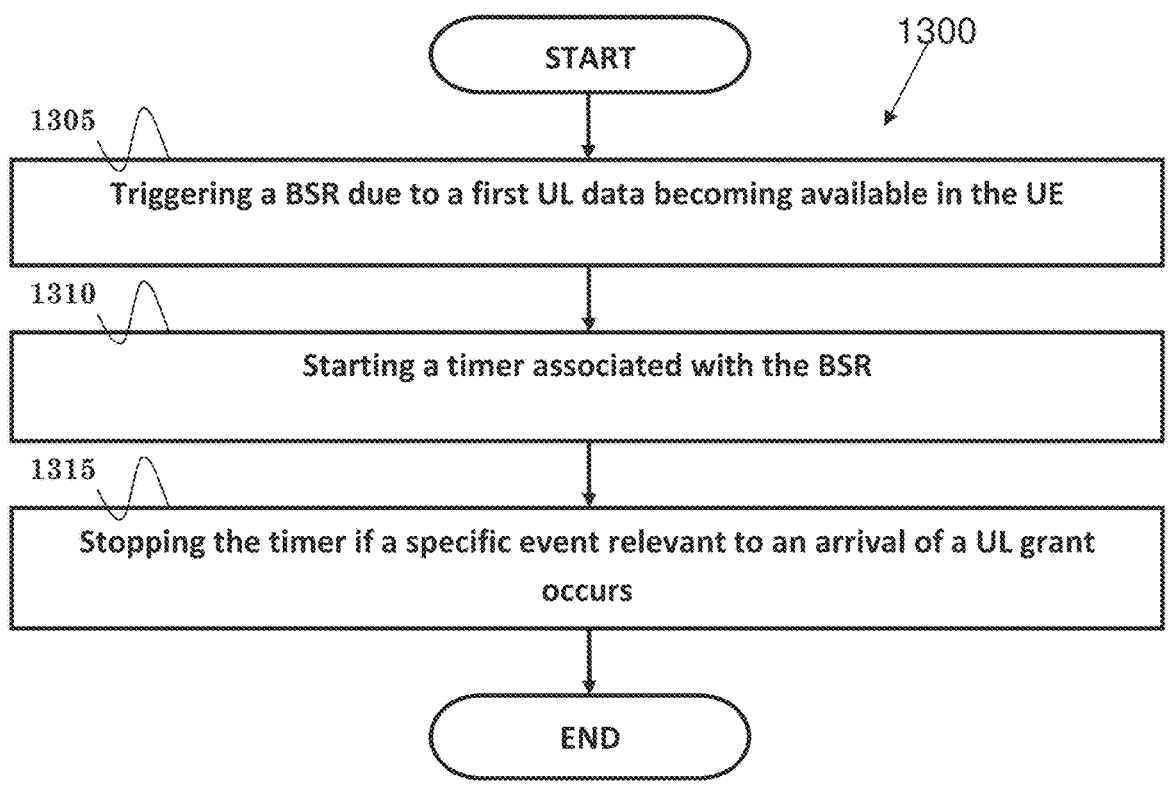
FIG. 13 is a flow chart according to one exemplary embodiment.

FIG. 13 is a flow chart 1300 from the perspective of a UE in accordance with one exemplary embodiment. In step 1305, a BSR is triggered due to a first UL data becoming available in the UE. In step 1310, a timer associated with the BSR is started. In step 1315, the timer is stopped if a specific event relevant to an arrival of a UL grant occurs.

Referring back to FIGS. 3 and 4, in one embodiment from the perspective of a UE, the device 300 includes a program code 312 stored in memory 310 of the transmitter. The CPU 308 could execute program code 312 (i) to trigger a BSR due to a first UL data becoming available in the UE, (ii) to start a timer associated with the BSR, and (iii) to stop the timer if a specific event relevant to an arrival of a UL grant occurs. In addition, the CPU 308 can execute the program code 312 to perform all of the above-described actions and steps or others described herein.

Figure 14:
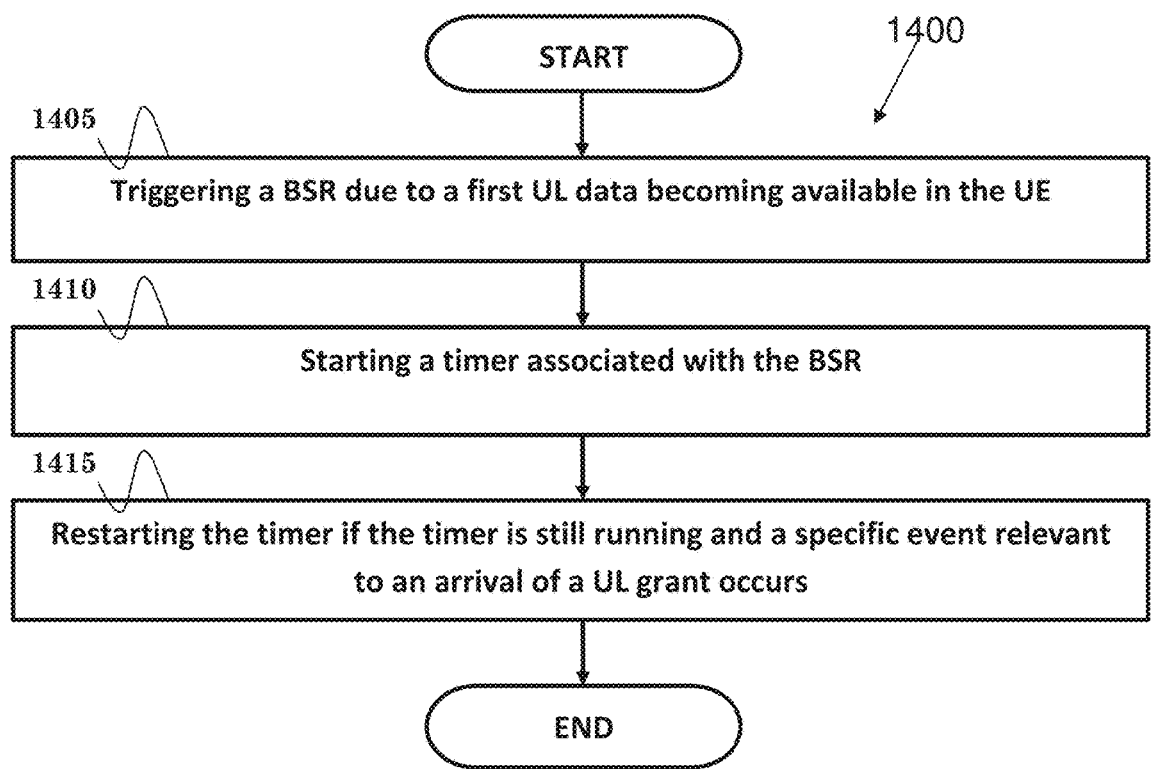
FIG. 14 is a flow chart according to one exemplary embodiment.

FIG. 14 is a flow chart 1400 from the perspective of a UE in accordance with one exemplary embodiment. In step 1405, a BSR is triggered due to a first UL data becoming available in the UE. In step 1410, a timer associated with the BSR is started. In step 1415, the timer is restarted if the timer is still running and a specific event relevant to an arrival of a UL grant occurs.

Referring back to FIGS. 3 and 4, in one embodiment from the perspective of a UE, the device 300 includes a program code 312 stored in memory 310 of the transmitter. The CPU 308 could execute program code 312 (i) to trigger a BSR due to a first UL data becoming available in the UE, (ii) to start a timer associated with the BSR, and (iii) to restart the timer if the timer is still running and a specific event relevant to an arrival of a UL grant occurs. In addition, the CPU 308 can execute the program code 312 to perform all of the above-described actions and steps or others described herein.

In one embodiment, the first UL data could be associated with a logical channel which is restricted to the timer. Furthermore, a SR (Scheduling Request) is not allowed to be triggered or sent if the timer is running. However, the SR could be triggered or sent if the timer is not running.

In one embodiment, the specific event could be the UE detects or receives the UL grant. The specific event could also be the UE transmits the first UL data. In addition, the specific event could be the UE transmits the BSR.

In one embodiment, the SR could be sent on a PUCCH (Physical Uplink Control Channel), the first UL data could be sent on a PUSCH (Physical Uplink Shared Control Channel), and the UL grant could be received or detected on a PDCCH (Physical Downlink Control Channel).

Figure 15:
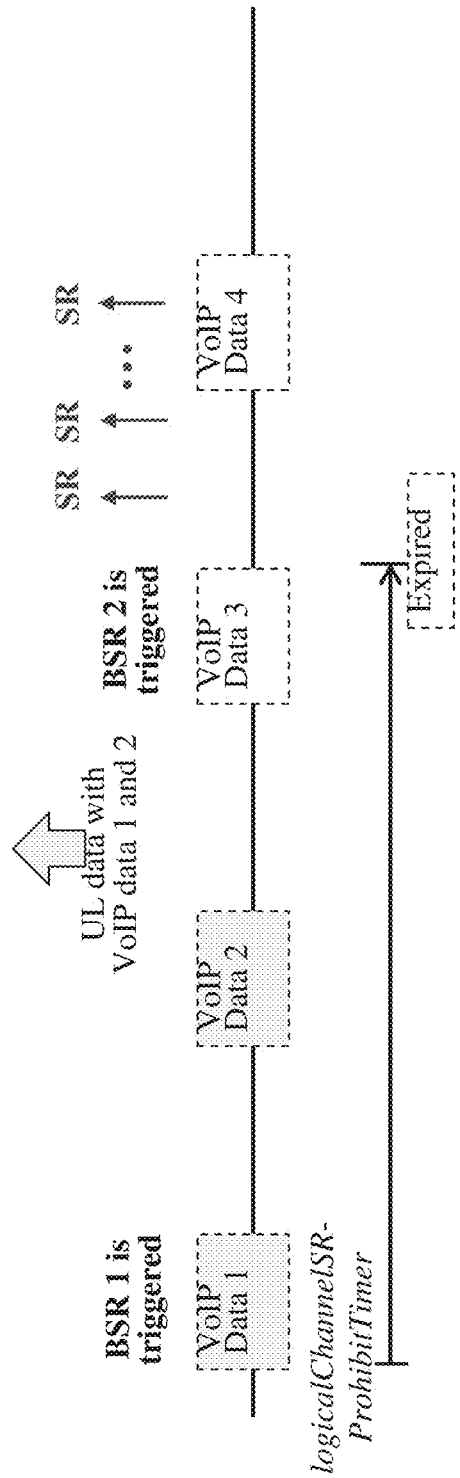
FIG. 15 is a diagram according to one exemplary embodiment.
Figure 16:
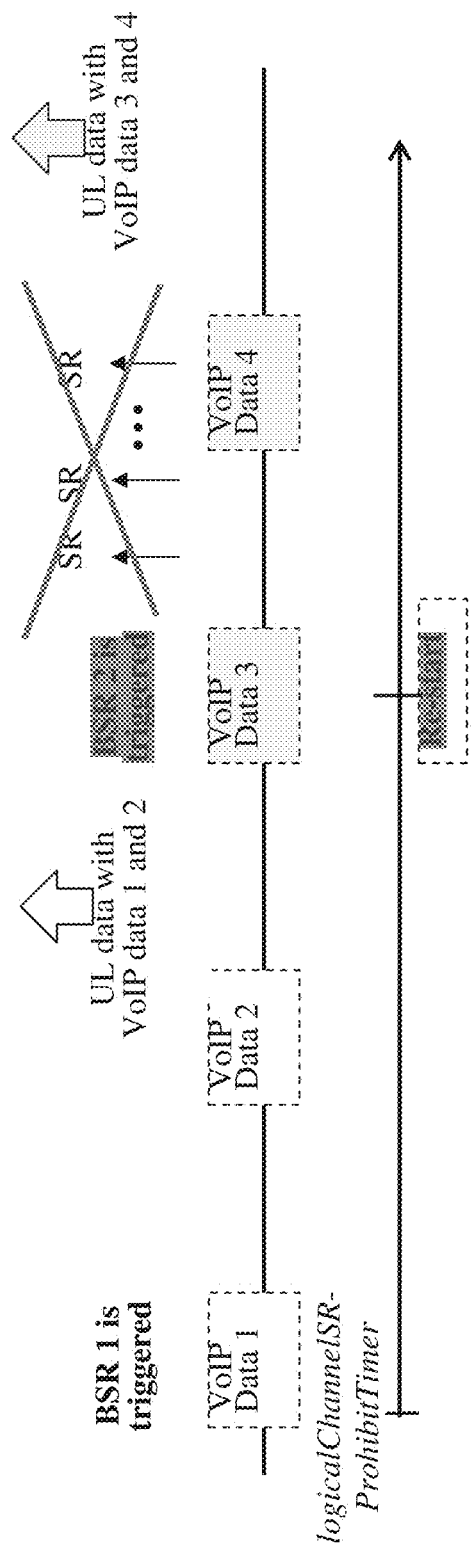
FIG. 16 is a diagram according to one exemplary embodiment.

As discussed in 3GPP R2-144973, VoLTE may be dynamically served to allow delay packing. However, it may be difficult for eNB to learn the right timing to send an UL grant for the SR suppression. Therefore, the newly introduced SR prohibit timer would also useful in this case. However, the aforementioned problem of unnecessary SR transmissions (e.g., interference to other UEs) and power waste may also occur as shown in FIG. 15. One possible solution is to restart the timer as illustrated in FIG. 16.

Figure 17:
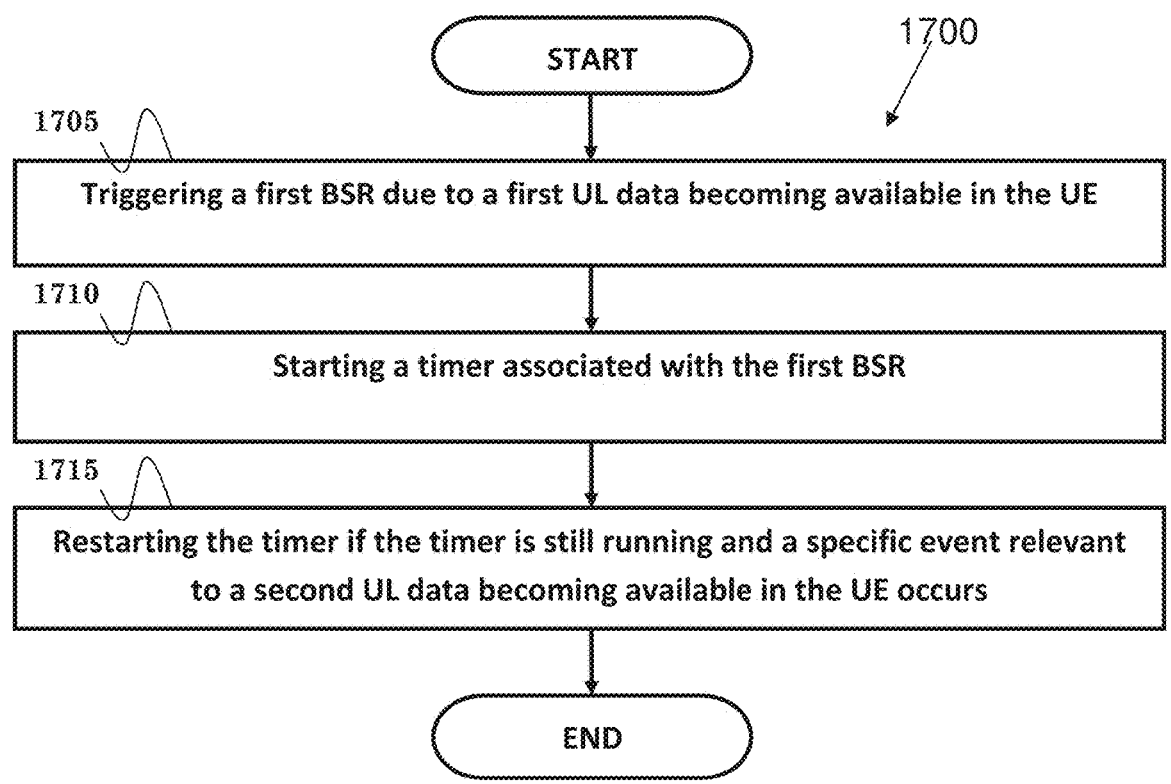
FIG. 17 is a flow chart according to one exemplary embodiment.

FIG. 17 is a flow chart 1700 from the perspective of a UE in accordance with one exemplary embodiment. In step 1705, a first BSR is triggered due to a first UL data becoming available in the UE. In step 1710, a timer associated with the first BSR is started. In step 1715, the timer is restarted if the timer is still running and a specific event relevant to a second UL data becoming available in the UE occurs.

In one embodiment, the first UL data and the second UL data could be associated with a logical channel which is restricted to the timer. Furthermore, a SR is not allowed to be triggered or sent if the timer is running. In addition, the SR could be allowed to be triggered or sent if the timer is not running.

In one embodiment, the specific event could be the triggering of a second BSR. In addition, the SR could be sent on a PUCCH, and the first UL data and the second UL data could be sent on a PUSCH.

Referring back to FIGS. 3 and 4, in one embodiment from the perspective of a UE, the device 300 includes a program code 312 stored in memory 310 of the transmitter. The CPU 308 could execute program code 312 (i) to trigger a first BSR due to a first UL data becoming available in the UE, (ii) to start a timer associated with the first BSR, and (iii) to restart the timer if the timer is still running and a specific event relevant to a second UL data becoming available in the UE occurs. In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a UE to handle a prohibit timer for Scheduling Request (SR) in a wireless communication system, the method comprising:
   triggering a first buffer status report (BSR) due to a first UL (Uplink) data becoming available in UE for transmission for a logical channel for which a logicalChannelSR-ProhibitTimer is set up by upper layers;
   starting the logicalChannelSR-ProhibitTimer associated with the first BSR; and
   determining if the logicalChannelSR-ProhibitTimer is still running and a specific event relevant to a second UL data becoming available in UE occurs; and
   restarting the logicalChannelSR-ProhibitTimer in response to determining that the logicalChannelSR-ProhibitTimer is still running and a specific event relevant to a second UL data becoming available in UE occurs,
   wherein a SR (Scheduling Request) is not allowed to be triggered or sent if the logicalChannelSR-ProhibitTimer is running, and the SR is allowed to be triggered or sent if the logicalChannelSR-ProhibitTimer is not running.

2. The method of claim 1, wherein the first UL data and the second UL data are associated with the logical channel which is restricted to the logicalChannelSR-ProhibitTimer.

3. The method of claim 1, wherein the specific event is that a second BSR is triggered.

4. The method of claim 1, wherein the SR is sent on a PUCCH (Physical Uplink Control Channel), the first UL data and the second UL data is sent on a PUSCH (Physical Uplink Shared Control Channel).

5. A UE (User Equipment), comprising:
   a control circuit;
   a processor installed in the control circuit; and
   a memory installed in the control circuit and operatively coupled to the processor;
   wherein the processor is configured to execute a program code stored in the memory to:
      trigger a first buffer status report (BSR) due to a first UL (Uplink) data becoming available in UE for transmission for a logical channel for which a logicalChannelSR-ProhibitTimer is set up by upper layers;
      start the logicalChannelSR-ProhibitTimer associated with the first BSR; and
      restart the logicalChannelSR-ProhibitTimer if the logicalChannelSR-ProhibitTimer is still running and a specific event relevant to a second UL data becoming available in UE occurs,
   wherein a SR (Scheduling Request) is not allowed to be triggered or sent if the logicalChannelSR-ProhibitTimer is running, and the SR is allowed to be triggered or sent if the logicalChannelSR-ProhibitTimer is not running.

6. The UE of claim 5, wherein the first UL data and the second UL data are associated with the logical channel which is restricted to the logicalChannelSR-ProhibitTimer.

7. The UE of claim 5, wherein a SR (Scheduling Request) is not allowed to be triggered or sent if the logicalChannelSR-ProhibitTimer is running, and the SR is allowed to be triggered or sent if the logicalChannelSR-ProhibitTimer is not running.

8. The UE of claim 5, wherein the specific event is that a second BSR is triggered.

9. The UE of claim 5, wherein the SR is sent on a PUCCH (Physical Uplink Control Channel), the first UL data and the second UL data is sent on a PUSCH (Physical Uplink Shared Control Channel).

* * * * *